United States Patent [19]
Cheon

[11] Patent Number: 5,963,019
[45] Date of Patent: Oct. 5, 1999

[54] BATTERY PACK WITH BATTERY PROTECTION CIRCUIT

[75] Inventor: Kyung-Yong Cheon, Soowon-shi, Rep. of Korea

[73] Assignee: SamSung Electronics Co., Ltd., Suwon, Rep. of Korea

[21] Appl. No.: 08/932,174

[22] Filed: Sep. 17, 1997

[30] Foreign Application Priority Data

Sep. 17, 1996 [KR] Rep. of Korea ..................... 96-40426

[51] Int. Cl.$^6$ .................................................. H02J 7/04
[52] U.S. Cl. ........................................... 320/150; 320/134
[58] Field of Search ................................ 320/150, 134, 320/112, 118, 145, 152

[56] References Cited

U.S. PATENT DOCUMENTS

| | | | |
|---|---|---|---|
| 4,342,953 | 8/1982 | Collins | 320/136 |
| 4,622,508 | 11/1986 | Matteau et al. | 320/118 |
| 5,073,837 | 12/1991 | Baek | 320/136 |
| 5,177,426 | 1/1993 | Nakanishi et al. | 320/134 |
| 5,349,280 | 9/1994 | Kim | 320/128 |
| 5,477,130 | 12/1995 | Hashimoto et al. | 320/164 |
| 5,539,299 | 7/1996 | Fernandez et al. | 320/163 |
| 5,576,612 | 11/1996 | Garrett et al. | 320/106 |
| 5,602,460 | 2/1997 | Fernandez et al. | 320/152 |
| 5,608,304 | 3/1997 | Okumura | 320/134 |
| 5,631,537 | 5/1997 | Armstrong | 320/118 |
| 5,646,508 | 7/1997 | van Phuoc et al. | 320/152 |

Primary Examiner—Peter S. Wong
Assistant Examiner—Lawrence Luk
Attorney, Agent, or Firm—Robert E. Bushnell, Esq.

[57] ABSTRACT

A battery pack having a battery protection circuit designed to prevent damages induced by a short circuit of outside terminals when the battery pack is separated from an electronic device. The battery pack comprises a chargeable battery cell; positive and negative battery terminals connectable to both ends of the battery cell; a temperature sensing terminal connected to the negative battery terminal through a thermistor for sensing a surface temperature of said battery pack; and a battery protection circuit electrically connected to open at least one power supply line between one of the positive terminal and the positive end of the battery cell and the negative terminal and the negative end the battery cell, when the battery pack is separated from an electronic device. The battery protection circuit is constructed by a switching controller having an input terminal connected to the temperature sensing terminal for detecting a thermal resistive value of the thermistor and generating a control signal when the thermal resistive value is below a preset level; a switching circuit provided along one of the power supply lines for cutting off the power supply line in response to the control signal; and a low power supplier connected in parallel with the positive power supply line for supplying an operating voltage battery control circuit of the electronic device which regulates the operating voltage. With this arrangement, short-circuit of the power terminals provided in the outside the battery pack can be effectively prevented in order to protect the quality of battery cell.

12 Claims, 5 Drawing Sheets

BATTERY PACK WITH BATTERY PROTECTION CIRCUIT

CLAIM FOR PRIORITY

This application makes reference to, incorporates the same herein, and claims all benefits accruing under 35 U.S.C. §119 from an application for A BATTERY PACK WITH BATTERY PROTECTION CIRCUIT earlier filed in the Korean Industrial Property Office on the Sep. 17, 1996, and there duly assigned Ser. No. 40426/1996, a copy of which application is annexed hereto.

BACKGROUND OF THE INVENTION

1. Technical Field

The present invention relates to a rechargeable battery pack for use in an electronic device, and more particularly to a battery pack having a battery protection circuit for protecting a battery from damages induced by short circuits of outside terminals when the battery pack is separated from the electronic device.

2. Related Art

Batteries are widely used in portable electronic devices such as radios, radiophones, notebook computers, video cameras, and cassette tape players etc. Such batteries are typically available in two different types such as those characterized as rechargeable or non-rechargeable and exhibit different end of life voltage characteristics and effective series resistances. Nonrechargeable battery types are those ordinary alkaline batteries that should not be subjected to recharging attempts. Rechargeable battery types are those nickel-cadmium (Ni—Cd), nickel-hydrogen (Ni—H) and nickel metal-hydride (Ni-MH) batteries that should be charged at different rates with different conditions.

Recently, lithium-ion (Li-ion) batteries of organic electrolytic cells have become popular as a power source for portable electronic devices because the battery cells are low weight and overall size with high energy density, low temperature characteristics and stable storage capability. However, Li-ion battery cells are sensitive to overcharging or overdischarging; consequently, no overcharging or overdischarging of any particular cell must be ensured. Generally, Li-ion battery cells are disposed in series and usually housed in a battery pack that is detachable from the electronic device, and are charged differently from other types of rechargeable batteries. Exemplars of contemporary Li-ion battery pack are disclosed in U.S. Pat. No. 5,602,460 for Overcharge Current Protection Circuit And Battery Pack Using Same issued to Fernandez et al., U.S. Pat. No. 5,631,537 for Battery Charge Management Protection Apparatus issued to Armstrong, and U.S. Pat. No. 5,646,508 for Battery Pack Having A Processor Controlled Battery Operating System issued to Van Phuoc et al. Specific battery protection circuits such as disclosed in U.S. Pat. No. 4,342,953 for Battery Protection Circuit issued to Collins, U.S. Pat. No. 4,622,508 for Lithium Battery Protection Circuit issued to Matteau et al., U.S. Pat. No. 5,073,837 for Low Voltage Protection Circuit issued to Baek, U.S. Pat. No. 5,177,426 for Over-Discharge Protection Circuitry issued to Nakanishi et al., U.S. Pat. No. 5,349,280 for Battery Protective Circuit issued to Kim, and U.S. Pat. No. 5,539,299 for Protection Switch For A Battery Powered Device issued to Fernandez et al., may be available to protect the battery cells from overcharging and overdischarging. Other protection elements such as poly-switches and fuses may be used to prevent excessive voltage or current from applying to the battery cells One significant problem with contemporary battery pack is that positive and negative battery terminals may remain electrically connected even if the battery pack is separated from battery control circuitry. As a result, the positive and negative battery terminals can be inadvertently shorted by a conductor or when in contact with outside conductive material to form resistive body which can severely damage the battery cells. Recent solutions to this problem are disclosed, for example, in U.S. Pat. No. 5,477,130 for Battery Pack With Short Circuit Protection issued to Hashimoto et al., and U.S. Pat. No. 5,608,304 for Battery Protection Circuit And Battery Pack And Apparatus Using the Battery Pack issued to Okumura. Short circuit protection mechanism is incorporated into the battery pack to protect the battery cells from short circuits when the battery pack is removed from the electronic device. While the short circuit protection circuits as disclosed by Hashimoto et al. and Okumura are worthy solutions to the problem, I have noted that alternative and simple circuit configurations are still required for short circuit protection.

SUMMARY OF THE INVENTION

Accordingly, it is therefore an object of the present invention to provide a battery pack with short circuit protection.

It is also an object to provide a battery pack having a battery protection circuit with simple circuit configuration for protecting battery cells from damages induced by short circuits when the battery pack is separated from an electronic device.

These and other objects of the present invention can be achieved by a battery pack with a battery protection circuit for a chargeable battery cells. Positive and negative battery terminals are connected to both ends of the battery cell. A temperature sensing terminal is connected to the negative battery terminal through a thermistor perceiving the surface temperature of the battery pack; and a battery protection circuit is included to open at least one power supply line between either the positive terminal and the positive end of the battery cell or the negative terminal and the negative end the battery cell, when the battery pack is separated from an electronic device. The battery protection circuit may use a switching controller with an input connected to the temperature sensing terminal for detecting a thermal resistive value of the thermistor and for generating a control signal when the value is below the preset level, and a switching circuit may be used along one of the power supply lines to interrupt the power supply line in response to the control signal supplied from the switching controller.

In accordance with an embodiment of the invention, the switching controller uses a battery pack detector connected to the temperature sensing terminal for reading a thermal voltage value of the thermistor and generating a first detection signal representative of detachment of the battery pack. An overcharge and discharge detector is connected to generate a second detection signal upon occurrence of overcharged and discharged states of the battery cell on a basis of the voltage values at both ends of the battery cell. A controller is electrically connected to the battery pack detector and the overcharge and discharge detector to set on and off states of the switching Circuit in response to one of the first and the second detection signal from the battery pack detector and the battery over charge detector.

The switching circuit may be constructed with first and second MOS FET transistors, with the gate terminals connected to output terminals of the switching controller, the source terminals connected with each other, and the drain terminals of the transistors connected with the positive power terminal and the positive end of the battery cells, respectively. First and second diodes are coupled between the source and drain terminals, and cathode terminals of each diode are connected with the drain terminals of the first and second transistors.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in Which like reference symbols indicate the same or similar components, wherein.

DETAILED DESCRIPTION OF THE PREFERRED EMBODIMENT

Figure 1:
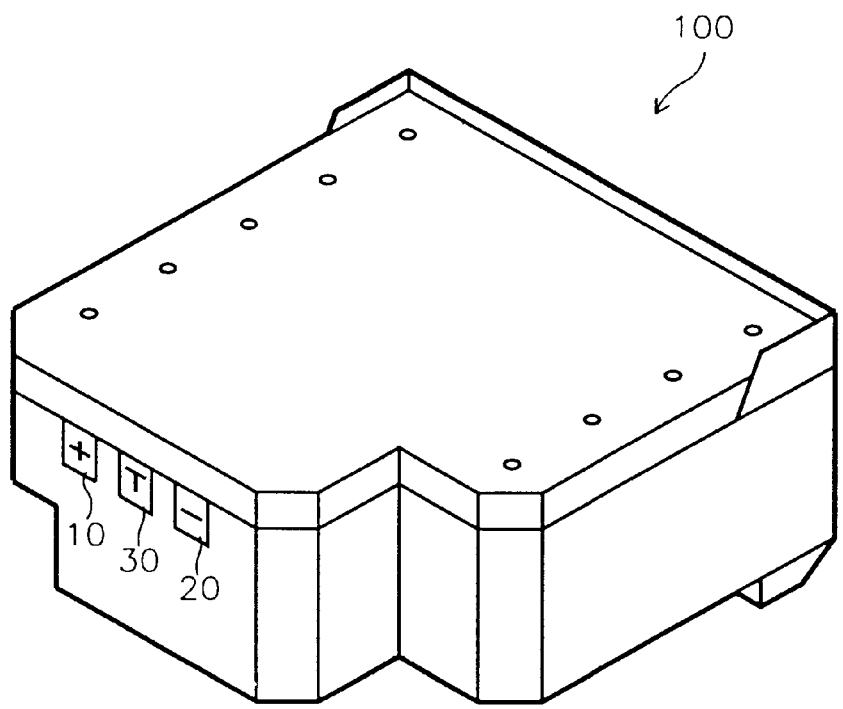
FIG. 1 is a perspective view of a typical battery pack for use in a portable electronic device.

Referring now to the drawings, FIG. 1 illustrates a Li-ion battery pack. Battery pack 100 is provided with three electric terminals (+), (−) and (T), respectively 10, 20, and 30, at one side of the battery housing. Terminal 10 represents the positive electric terminal for contacting a positive power supply terminal in the main body of the electronic device. Also, terminal 20 represents the negative electric terminal for contacting the ground-voltage terminal of the device. In addition, terminal 30 represents a temperature sensing terminal T for providing a temperature sensing signal to a battery control circuitry of the electronic device. The temperature sensing signal represents the temperature of the battery surface during charging or discharging operations of battery pack 100.

The battery control circuitry is often called a "smart battery" circuitry when it is incorporated into notebook computers. Smart battery circuitry prevents the battery pack from,becoming damaged by improper charging. The smart battery circuitry includes a micro-controller having the sole function of monitoring the performance of the battery and regulating both the charging and discharging of the battery to achieve optimum performance. This smart battery circuitry continually communicates with the device or charger connected to the battery to achieve these goals.

Figure 2:
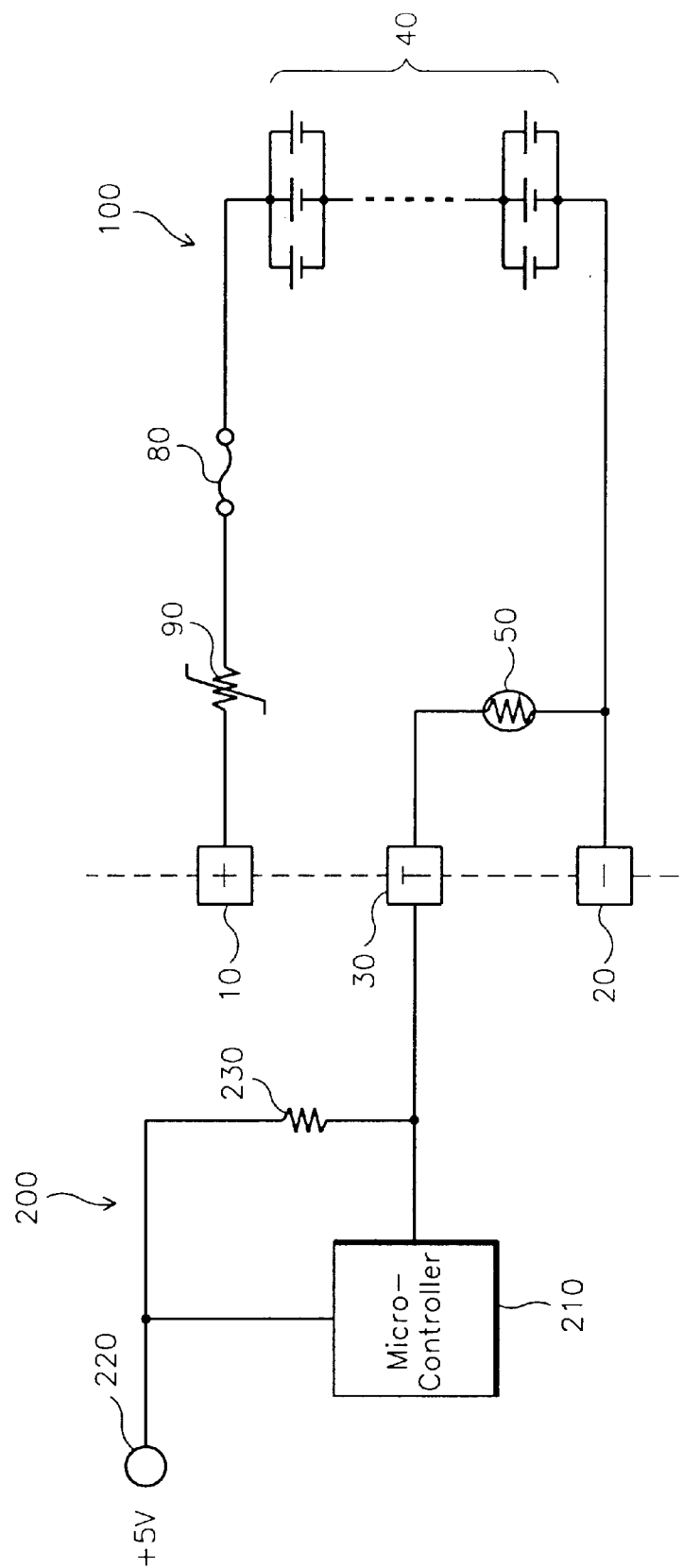
FIG. 2 is a circuit diagram of a battery pack with a battery protection circuit and a battery control circuit for use in a portable electronic device.

Referring now to FIG. 2, which illustrates atypical Li-ion battery pack equipped with a smart battery circuitry. Reference number 100 denotes the internal circuit of the Li-ion battery pack, and 200 denotes a part of the smart battery circuitry. The battery pack 100 is constructed with a plurality of battery cells 40, a positive battery terminal 10 connected with the positive (+) end of battery cells 40 via a fuse 80 and a poly-switch 90 in series connection, a negative battery terminal 20 connected with the negative (−) end of battery cells 40, and a temperature sensing terminal 30 connected with the negative battery terminal 20 through an NTC type thermistor 50 gauging the surface temperature of battery 40. Temperature sensing terminal 30 is connected to an input of micro-controller 210 of smart battery circuitry 200 housed in the portable computer. Micro-controller 210 is supplied with an appropriate operating voltage (e.g., +5V) from a regulator 220. The operating voltage supply line is also applied to temperature sensing terminal 30 via resistor 230.

When battery pack 100 is mounted in the portable computer and performs charging/discharging operation, said fuse 80 and poly-switch 90 function as a protection element. The fuse 80 and poly-switch 90 respond to the excessive voltage or current applied to the battery 40 and cut off power supply line between the positive battery terminal 10 and the positive end of the battery cells. In particular, the polyswitch 90 is operated with the amount of current flow; when the over current flows, said poly-switch 90 is automatically opened and the switch is closed when the current returns to the normal state.

In this arrangement, however, problems arise in that the positive and negative battery terminals 10 and 20 of the battery pack 100 remain electrically alive even if the battery pack 100 is separated from the battery circuitry 200 of the electronic device. Therefore, terminals 10, 20 can be inadvertently shorted by a conductor or contacted with some outside conductive material to form resistive body. Thus, the battery 40 is permanently opened or severely damaged.

Figure 3:
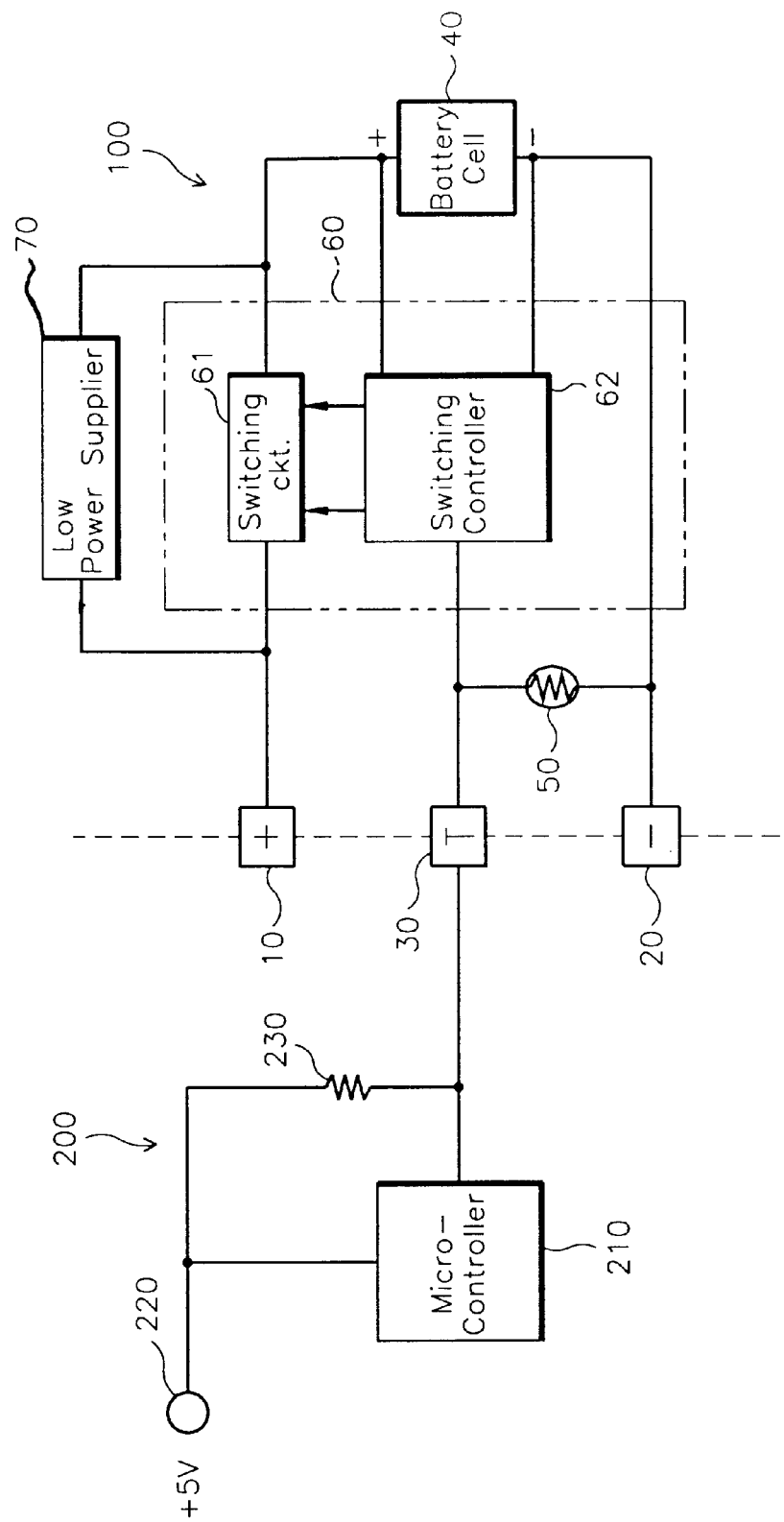
FIG. 3 is a schematic block diagram of a battery pack with a battery protection circuit constructed according to the principles of the present invention.
Figure 4:
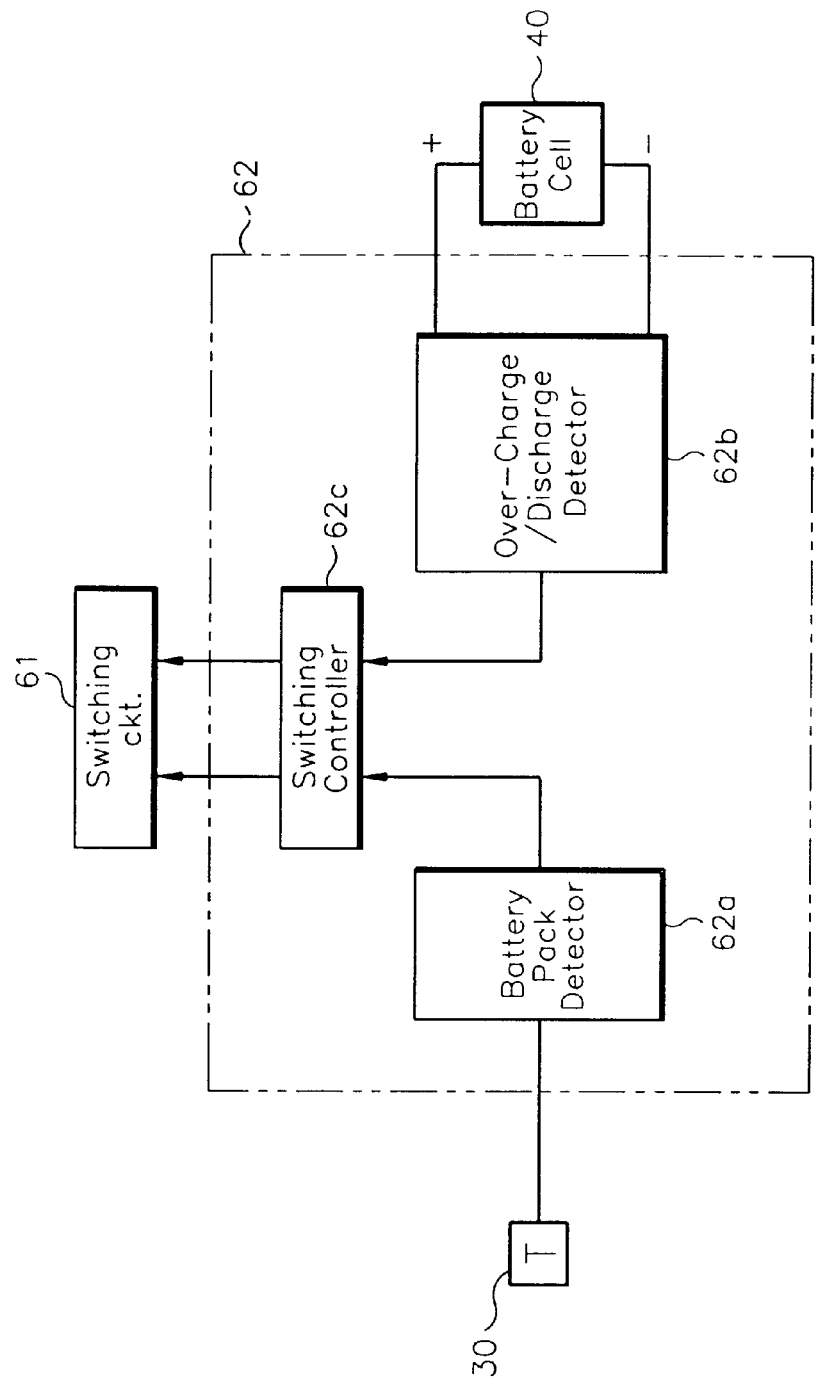
FIG. 4 is a detailed block diagram of a switching controller of the battery protection circuit shown in FIG. 3.
Figure 5:
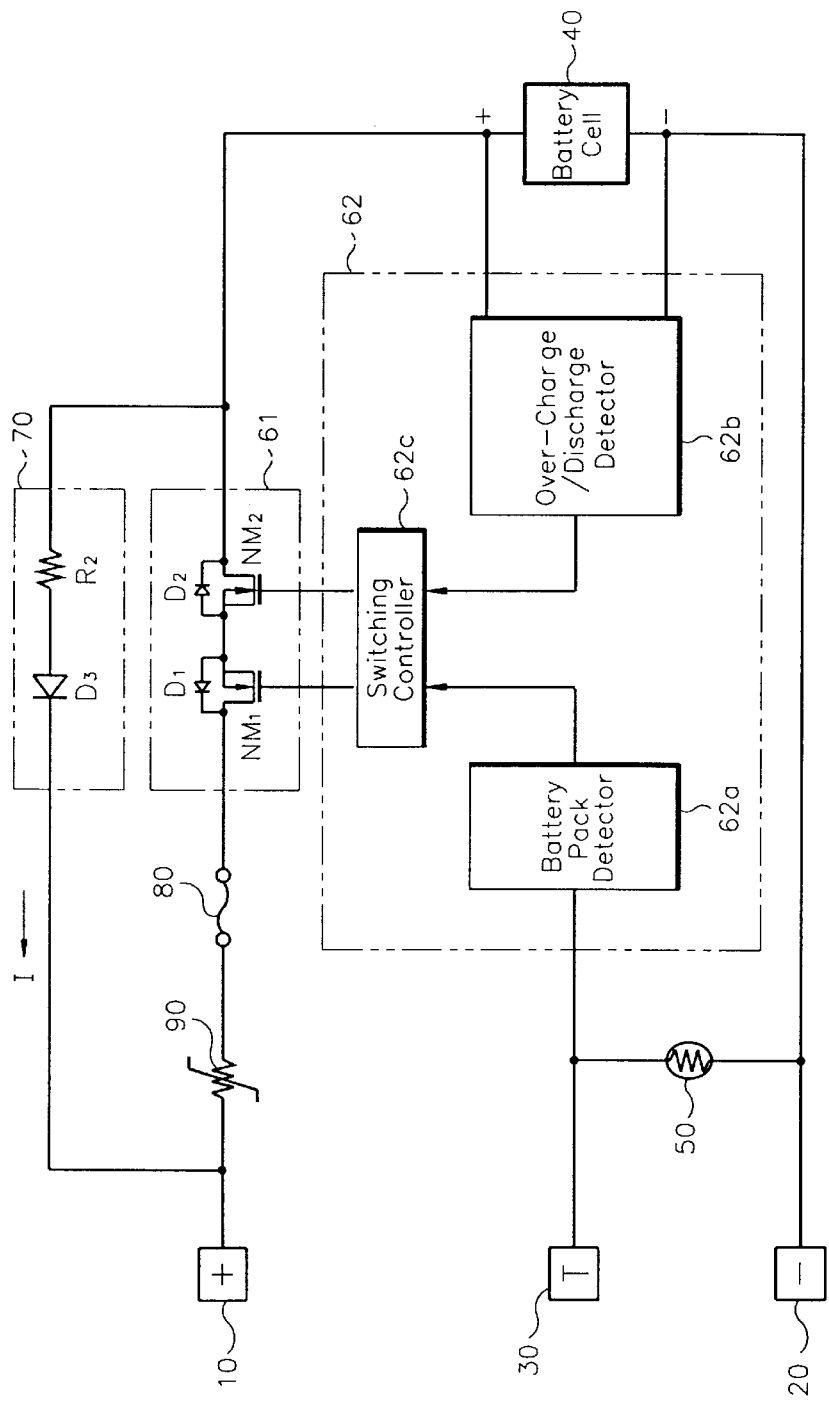
FIG. 5 is a detailed circuit diagram of the battery protection circuit shown in FIG. 3.

Turning now to FIG. 3 which illustrates a battery pack with a battery protection circuit constructed according to the principles of the present invention, and FIGS. 4 and 5 which illustrate an internal structure of the battery protection circuit shown in FIG. 3. The battery pack with a battery protection circuit includes a rechargeable battery 40 and the first and second power terminals 10, 20 connected to both ends of said battery. When the battery pack is removed or separated from an electronic device, the battery protection circuit of the invention detects a detachment state of the battery pack and cuts off at least one power supply line led from the first power terminal to one end of the battery cell, or from the second power terminal to the other end of the battery cell. With this arrangement, short-circuit of the power terminals 10 and 20 provided in the outside the pack can be effectively prevented, and thus prevents the inner battery cell from being damaged.

Referring to FIG. 3, reference number 100 denotes an internal circuitry of the Li-ion battery pack, and 200 denotes a part of the smart battery circuitry constructed in an electronic device, for example a portable computer. The battery pack comprises a plurality of battery cells 40, a positive battery terminal 10 connected with the positive (+) end of said battery cells 40, a negative battery terminal 20 connected with the negative (−) end of said battery cells 40 a temperature sensing terminal 30 connected with the negative battery terminal 20 through an NTC type thermistor 50 perceiving the surface temperature of the battery 40, and a battery protection circuit 60 for protecting internal circuitry of the battery cell when the battery pack is detached from the electronic device, and a low power supplier 70 connected in parallel with the positive power supply line for supplying an operating voltage for the micro-controller 210 of the smart battery circuitry.

Temperature sensing terminal 30 is connected to an input of the micro-controller 210 of the smart battery circuitry 200 provided in the portable computer. Alternatively, the micro-controller 210 can be supplied with the appropriate operating voltage (e.g., +5V) from the output of a voltage regulator 220 receiving the computer system power. This operating voltage line is also led to the temperature sensing terminal 30 via a resistor 230 to detect thermal resistance of the thermistor 50.

The protection circuit 60 comprises a switching controller 62 and a switching circuit 61. At one input of the switching controller 62, a voltage signal corresponding to the resistive value of the thermistor 50 is applied. The switching controller 62 detects the charging/discharging operation of the battery pack from the thermal voltage signal, and produces a switching control signal. The switching circuit 61 maintains ON or OFF state of the power supply line between the positive power terminal 10 and the positive end of the battery cells 40 in response to the control signal supplied from the switching controller 62. The switching circuit 61 may be provided in the other power supply line between the negative power terminal 20 and battery cell 40.

FIG. 4 illustrates a detailed configuration of the switching controller 62 of the battery protection circuit shown in FIG. 3. As shown in FIG. 4, the switching controller 62 comprises a battery pack detector 62a connected to the temperature sensing terminal 30 for detecting a thermal voltage value of the thermistor 50 and generating a corresponding detection signal representative of a detachment state of the battery pack. In addition, the switching controller 62 includes an over-charge/discharge detector 62b for detecting an over charge/discharge state of the battery cells 40 by sensing the voltage values at both ends of the battery cells 40 and generating a corresponding detection signal, and a switching controller 62c for controlling an on/off state of the switching, circuit 61 in response to at least one detection signal fed from the battery pack detector 62a and the battery over charge/discharge detector 62b.

A detailed circuit diagram of the switching circuit 61 and the low power supplier 70 is shown in FIG. 5. Referring to FIG. 5, the low power supplier 70 of the battery protection circuit includes a diode D3 and a resistor R2, in series connection such that the current I flows through the diode D3 from the battery cells 40 to the positive power terminal 10. The switching circuit 61 includes first and second MOS FET transistors NM1 and NM2, where the gate terminals thereof are connected with outputs of said switching controller 62c, the source terminals connected with each other, and the drain terminals of the transistor NM1 and NM2 are connected with the positive power terminal 10 and the positive end of the battery cells 40, respectively. In addition, first and second diode D1 and D2 are provided between the source and drain terminal thereof, in which cathode terminals of each diode D1 and D2 are connected with the drain terminals of the first and second transistors NM1 and NM2.

Preferably, a thermal fuse 80 and a poly switch 90 are provided in series connection between the positive power terminal 10 and the switching circuit 61. In addition, a thermistor 50 is provided between the temperature sensing terminal 30 and the negative power terminal 20 to sense the surface temperature of the battery pack.

The operation of the battery pack with a battery protection circuit constructed according to the principles of the present invention will now be described in detail with reference to FIGS. 3 to 5 hereinbelow.

First, when the battery pack is mounted in a notebook computer, for example, the positive power terminal 10, the ground terminal 20, and the temperature sensing terminal 30 contact with the power-supply terminal, ground terminal, and one input of the micro-controller 210 which constitutes the smart battery circuitry, respectively.

After the battery pack 100 is mounted, the battery power is supplied with the low power supplier 70 which in turn provides an appropriate amount of said power supply to the micro-controller 210 in the computer system 200. The current value I flowing through the low power supplier 70 is about less than 1 mA.

Meanwhile, the battery pack detector 62a will read the voltage values appeared at the temperature sensing terminal 30. Since the voltage values at the temperature sensing terminal 30 has limited ones (e.g., 1 V~4 V), the battery pack detector 62a assumes that the battery pack 100 is mounted to the computer system 200. Then, the battery pack detector 62a will output a detection signal informing that a battery pack 100 is already mounted to the system.

Then, the switching controller 62c receives the battery pack detection signal from the battery pack detector 62a and controls the switching circuit 61 consisting of two MOS transistors NM1, NM2 and two diodes D1, D2, to connect the internal power supply line with the computer system. With this configuration, the battery cell 40 may perform a charging or discharging operation.

The fuse 80 and poly switch 90 serve as protection elements when a battery pack 100 mounted to the computer system 200 for use. If an excessive voltage or over current is applied to the battery 40, these protection elements perceive the over voltage or over current and cut off the power supply line automatically. In particular, the poly switch 90 operates in parallel with the current flow; when an over current flows, it is automatically opened and if the current reaches the normal level, the circuit is closed. Next, when the battery pack 100 is separated from the computer system 200, the battery pack detection circuit 62a reads the voltage values of the temperature sensing terminal 30 and in the same manner that when a battery pack 100 is mounted to the computer system 200, it judges the disconnection of the battery pack 100. Since the battery pack 100 is separated from the computer system 200, the battery cell 40 do not perform any charge or discharge action and as a result, the voltage values at the temperature sensing terminal 30 will be 0 Volt. Therefore, the battery pack detector 62a will output a detection signal toward the switching controller 62c informing that a battery pack 100 is separated from the computer system 200.

Then, the switching controller 62c receiving the battery disconnection signal will output a switching control signal for the MOS transistors NM1, NM2 of the switching circuit 61 to turn off the first and second switch. Thus, a battery pack 100 maintains an open circuit state until it is remounted to a main body of computer 200.

In the above arrangement, the low power supplier 70 may be provided either by another battery pack or by the power supply in the computer system 200.

As apparent, the battery protection circuit of this invention is characterized in that the switching circuit 61 provided between the positive voltage terminal and positive end of the battery cells turns off the internal power supply line in response to the control signals produced in the switching controller 62 by detecting the thermal voltage values of temperature sensing terminal. When the battery pack is separated from the computer system, therefore, short-circuit damages of the battery pack induced by contacting the terminals with an outside conductor can be effectively prevented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A battery apparatus, comprising:
   a chargeable battery cell;
   positive and negative battery terminals connectable to both ends of the battery cell;
   a temperature sensing terminal connected to the negative battery terminal through a thermistor for sensing a surface temperature of said battery apparatus; and
   a battery protection circuit electrically connected to open at least one power supply line between one of the positive terminal and the positive end of the battery cell and the negative terminal and the negative end of the battery cell, when said battery apparatus is separated from an electronic device, said battery protection circuit comprising:
      a first controller having an input terminal connected to the temperature sensing terminal for detecting a thermal resistive value of the thermistor and generating a control signal when the thermal resistive value is below a preset level;
      a switching circuit provided along one of the power supply lines for cutting off the power supply line in response to the control signal supplied from said first controller; and
      a low power supplier connected in parallel with the positive power supply line for supplying an operating voltage for a battery controller of the electronic device, and said battery controller including a microcontroller of a smart battery circuitry provided in the electronic device for regulating said operating voltage, said first controller further comprising:
         a battery pack detector connected to the temperature sensing terminal, for reading the thermal voltage value of the thermistor and generating a signal representative of a detachment state of the battery apparatus; and
         a second controller electrically connected to said battery pack detector, for controlling an on/off state of said switching circuit in response to a detection signal fed from said battery pack detector.

2. The battery apparatus of claim 1, said low power supplier enabling the current to flow from the battery cell to the positive power terminal.

3. The battery apparatus of claim 1, said low power supplier further comprising a diode and a resistor connected in series for enabling the current to flow through the diode from the battery cell to the positive power terminal.

4. The battery apparatus of claim 3, the current flowing through the low power supplier exhibiting less than one milliampere.

5. The battery apparatus of claim 1, said switching circuit further comprising first and second MOSFET transistors, where gate terminals are connected with outputs of said first controller, source terminals are connected with each other, and drain terminals of the MOSFET transistor are connected with the positive power terminal and the positive end of the battery cell, respectively, and where first and second diodes are provided between the source and drain terminals, in which cathode terminals of each diode are connected with the drain terminals of said first and second MOSFET transistors.

6. A battery apparatus, comprising:
   a battery cell;
   positive and negative battery terminals connectable to both ends of the battery cell;
   a temperature sensing terminal connected to the negative battery terminal through a thermistor for sensing a surface temperature of said battery apparatus; and
   a battery protection circuit electrically connected to provide short circuit protection to the battery cell, when said battery apparatus is removed from an electronic device, said battery protection circuit comprising:
      a first controller responsive to a thermal resistive value of the thermistor, for generating a control signal;
      a switching circuit disposed between said positive battery terminal and a positive end of the battery cell, for cutting off power supply to the battery cell in response to the control signal; and
      a low power supplier connected in parallel with said switching circuit for permitting current to flow from the battery cell to said positive power terminal.

7. The battery apparatus of claim 6, said low power supplier further comprising a diode and a resistor connected in series for enabling the current to flow through the diode from the battery cell to the positive power terminal.

8. The battery apparatus of claim 6, the current flowing through the low power supplier exhibiting less than one milliampere.

9. The battery apparatus of claim 6, said first controller further comprising:
   a battery pack detector connected to the temperature sensing terminal, for reading the terminal voltage value of the thermistor and generating a first detection signal representative of a detachment state of said battery apparatus;
   an overcharge and discharge detector for detecting an overcharge/discharge state of the battery cell by sensing the voltage values at both ends of the battery cell and generating a second detection signal; and
   a second controller electrically connected to said battery pack detector and said overcharge and discharge detector, for controlling an on/off state of said switching circuit in response to at least one of said first and said second detection signal.

10. The battery apparatus of claim 6, further comprised of said switching circuit comprising first and second MOSFET transistors, where gate terminals are connected with outputs of said switching controller, source terminals are connected with each other, and drain terminals of the MOSFET transistors are connected with the positive power terminal and the positive end of the battery cell, respectively, and where first and second diodes are provided between the source and drain terminals, in which cathode terminals of each diode are connected with the drain terminals of said first and second MOSFET transistors.

11. A battery apparatus, comprising:
    a chargeable battery cell;
    positive and negative battery terminals connectable to both ends of the battery cell;

a temperature sensing terminal connected to the negative battery terminal through a thermistor for sensing a surface temperature of said battery apparatus; and a battery protection circuit electrically connected to open at least one power supply line between one of the positive terminal and the positive end of the battery cell and the negative terminal and the negative end of the battery cell, when said battery apparatus is separated from an electronic device, said battery protection circuit comprising:

a first controller having an input terminal connected to the temperature sensing terminal for detecting a thermal resistive value of the thermistor and generating a control signal when the thermal resistive value is below a preset level;

a switching circuit provided along one of the power supply lines for cutting off the power supply line in response to the control signal supplied from said first controller; and a low power supplier connected in parallel with the positive power supply line for supplying an operating voltage for a battery controller of the electronic device, and said battery controller including a microcontroller of a smart battery circuit provided in the electronic device for regulating said operating voltage, wherein said first controller includes:

an overcharge/discharge detector for detecting an overcharge/discharge state of the battery cell by sensing the voltage values at both ends of the battery cell and generating a corresponding detection signal; and a second controller for controlling an on/off state of switching circuit in response to the corresponding detection signal fed from the overcharge/discharge detector.

12. A battery apparatus, comprising:

a chargeable battery cell;

positive and negative battery terminals connectable to both ends of the battery cell;

a temperature sensing terminal connected to the negative battery terminal through a thermistor for sensing a surface temperature of said battery apparatus; and a battery protection circuit electrically connected to open at least one power supply line between one of the positive terminal and the positive end of the battery cell and the negative terminal and the negative end of the battery cell, when said battery apparatus is separated from an electronic device, said battery protection circuit comprising:

a first controller having an input terminal connected to the temperature sensing terminal for detecting a thermal resistive value of the thermistor and generating a control signal when the thermal resistive value is below a preset level;

a switching circuit provided along one of the power supply lines for cutting off the power supply line in response to the control signal supplied from said first controller; and a low power supplier connected in parallel with the positive power supply line for supplying an operating voltage for a battery controller of the electronic device, and said battery controller including a microcontroller of a smart battery circuit provided in the electronic device for regulating said operating voltage, wherein said first controller includes:

a battery pack detector connected to the temperature sensing terminal, for reading the thermal voltage value of the thermistor and generating a signal representative of a detachment state of the battery apparatus;

an overcharge/discharge detector for detecting an overcharge/discharge state of the battery cell by sensing the voltage values at both ends of the battery cell and generating a corresponding detection signal; and a second controller for controlling an on/off state of said switching circuit in response to at least one detection signal fed from the battery pack detector and the overcharge/discharge detector.

\* \* \* \* \*